United States Patent [19]

Erbstoesser

[11] 4,407,368

[45] * Oct. 4, 1983

[54] POLYURETHANE BALL SEALERS FOR WELL TREATMENT FLUID DIVERSION

[75] Inventor: Steven R. Erbstoesser, Houston, Tex.

[73] Assignee: Exxon Production Research Company, Houston, Tex.

[*] Notice: The portion of the term of this patent subsequent to Jul. 25, 1995 has been disclaimed.

[21] Appl. No.: 921,413

[22] Filed: Jul. 3, 1978

[51] Int. Cl.$^3$ ............... E21B 33/138; E21B 43/27
[52] U.S. Cl. ........................... 166/284; 166/193; 428/407
[58] Field of Search ............ 166/153, 179, 192, 193, 166/281, 284, 285, 292, 295, 305 R; 137/268; 138/89; 273/58 A, 58 R, 230; 428/403, 407

[56] References Cited

U.S. PATENT DOCUMENTS

| | | | |
|---|---|---|---|
| 2,754,910 | 7/1956 | Derrick et al. | 166/284 |
| 2,933,136 | 4/1960 | Ayers et al. | 166/284 |
| 3,010,514 | 11/1961 | Fox | 166/284 |
| 3,437,147 | 4/1969 | Davies | 166/284 |
| 4,102,401 | 7/1978 | Erbstoesser | 166/284 |
| 4,139,060 | 2/1979 | Muecke et al. | 166/281 |

FOREIGN PATENT DOCUMENTS 1319094  5/1973  United Kingdom.

*Primary Examiner*—James C. Cannon
*Attorney, Agent, or Firm*—Gary D. Lawson; Robert B. Martin

[57] ABSTRACT

Ball sealers comprising a solid core coated with a polyurethane elastomer are introduced into a well to seal well perforations and divert fluid therein. In the preferred embodiment the ball sealers are used in a hydrocarbon liquid treating fluid and have a density less than the treating fluid.

12 Claims, 2 Drawing Figures

POLYURETHANE BALL SEALERS FOR WELL TREATMENT FLUID DIVERSION

CROSS REFERENCES TO RELATED APPLICATIONS

U.S. Ser. No. 830,729 entitled, "Well Treatment Fluid Diversion With Low Density Ball Sealers", filed Sept. 6, 1977, now U.S. Pat. No. 4,102,401.

BACKGROUND OF THE INVENTION

1. Field of the Invention

This invention pertains to the treating of wells and more particularly to an improved method of diverting treating fluids during the treatment of wells.

2. Description of the Prior Art

It is common practice in completing oil and gas wells to set a string of pipe, known as casing, in the well and use cement around the outside of the casing to isolate the various formations penetrated by the well. To establish fluid communication between the hydrocarbon bearing formations and the interior of the casing, the casing and cement sheath are perforated.

At various times during the life of the well, it may be desirable to increase the production rate of hydrocarbons by using appropriate treating fluids such as acids, solvents or surfactants. If only a short, single pay zone in the well has been perforated, the treating fluid will flow into the pay zone where it is required. As the length of the perforated pay zone or the number of perforated pay zones increases, the placement of the fluid treatment in the regions of the pay zones where it is required becomes more difficult. For instance, the strata having the highest permeability will most likely consume the major portion of a given stimulation treatment leaving the least permeable strata virtually untreated. Therefore, techniques have been developed to divert the treating fluid from its path of least resistance so that the low permeability zones are also treated.

One technique for achieving diversion involves the use of downhole equipment such as packers. Although these devices are effective, they are quite expensive due to the involvement of associated workover equipment required during the tubing-packer manipulations. Additionally, mechanical reliability tends to decrease as the depth of the well increases.

As a result, considerable effort has been devoted to the development of alternative diverting methods. One widely used diverting technique uses small rubber-coated balls, known as ball sealers, to seal off casing perforations.

These ball sealers are pumped into the wellbore along with the formation treating fluid. The balls are carried down the wellbore and onto the perforations by the flow of the fluid through the perforations into the formation. The balls seat upon the perforations and are held there by the pressure differential across the perforations.

Major advantages of utilizing ball sealers as a diverting agent include easy to use, positive shutoff, independent of the formation, and non-damaging to the well. The ball sealers are injected at the surface and transported by the treating fluid. Other than a ball injector, no special or additional treating equipment is required. The ball sealers are designed to have an outer covering sufficiently compliant to seal a jet formed perforation and to have a solid, rigid core which resists extrusion into or through the perforation. Therefore, the ball sealers will not penetrate the formation and permanently damage the flow characteristics of the well.

Several requirements are repeatedly applied to ball sealers as they are normally utilized today. First, the ball sealers must be chemically inert in the environment to which they are exposed. Second, they must seal effectively, yet not extrude into the perforations. Third, the ball sealers must release from the perforations when the pressure differential into the formation is relieved.

To meet these requirements, various materials for ball sealers have been suggested including rubber, nylon, plastic, aluminum, rubber-covered aluminum, rubber-covered phenolic, rubber-covered nylon, and even permeable plastic consolidated walnut hull balls. One difficulty with ball sealers composed of such materials is that the balls which are currently available often do not exhibit sufficient resistance to chemical attack by treating fluids, especially those treating fluids containing aromatic solvents. For example, most rubber coated ball sealers lose their structural integrity in the presence of treating fluids which contain xylene. This can result in the rubber cover separating from the cores. Sometimes, the perforation can actually cut the rubber covering in the area of the pressure seal. Once the ball sealer loses its structural integrity the unattached rubber is free to lodge permanently in the perforation which can reduce the flow capacity of the perforation and may permanently damage the well. Another problem with rubber coated balls is that they are normally manufactured by compression mold techniques which produces a core positioned eccentrically within the coating. Such balls do not provide a uniform resilient surface for seating on the perforations.

A need exists for an improved ball sealer which overcomes the problems of the prior art ball sealers.

SUMMARY OF THE INVENTION

The present invention overcomes the limitations of ball sealers used in the prior art by using a ball sealer having a polyurethane covering. Ball sealers covered with polyurethane resist chemical degradation by treating fluids while effectively sealing jet perforations and resisting extrusion into the perforations.

The present invention provides an improved method for diverting fluids in the treatment of subterranean formations. The method involves the use of an improved ball sealer comprising polyurethane or a composite consisting of a rigid core having a polyurethane coating. The polyurethane, preferably of the polyester elastomer or polyether elastomer type, provide a ball sealer that is resistant to solvents (polyester base) or aqueous fluids (polyether based). It is preferred that the density of the ball sealers is less than that of the treating liquid and that the ball sealers be made by transfer molding techniques to provide a substantially uniform covering for the core. It is preferred that the ball sealers composed of the composite material have a density less than the treating fluid.

Experiments have shown that a particularly suitable ball includes a syntactic foam core having a polyurethane ester-base elastomer coating.

Briefly, the method is carried out by flowing down the well a plurality of the ball sealers described above until the ball sealers engage and seal perforations within the well. The treating fluid is then diverted to the unsealed portions providing an effective means for injecting treating fluids through all or more of the well perforations. The polyurethane elastomers are particularly suited for use as buoyant balls because of their relatively low density (about 1.0 g/cc).

DESCRIPTION OF THE PREFERRED EMBODIMENTS

Figure 1:
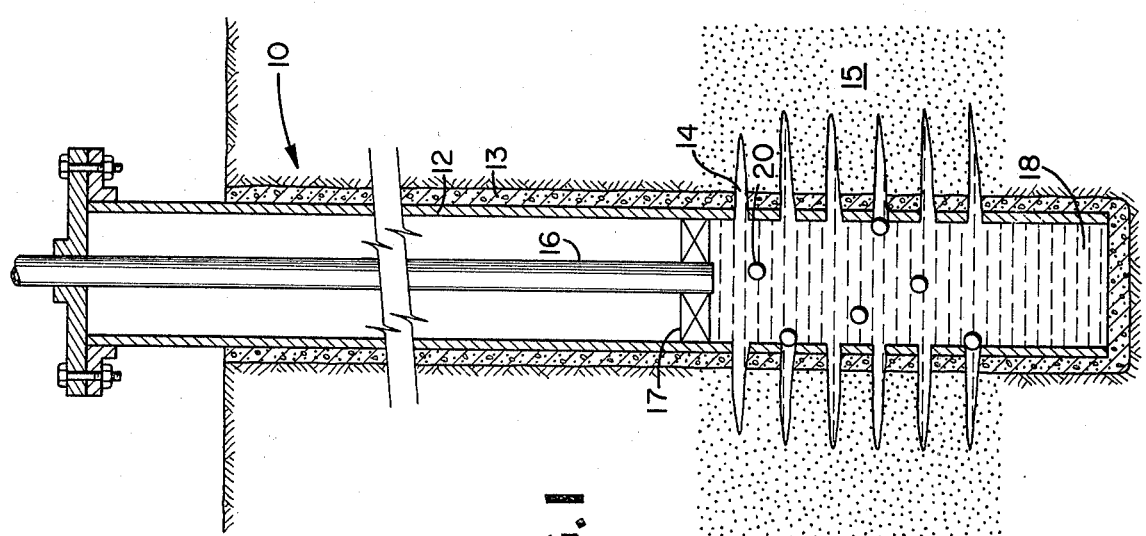
FIG. 1 is an elevation view in section of a well illustrating the practice of the present invention.

Utilization of the present invention according to the preferred embodiment is depicted in FIG. 1. The well 10 of FIG. 1 has a casing 12 run to the bottom of the wellbore and cemented around the outside to hold casing 12 in place and isolate the penetrated formations or intervals. The cement sheath 13 extends upward from the bottom of the wellbore at least to a point above the producing strata 15. For the hydrocarbons in the producing strata 15 to be produced, it is necessary to establish fluid communication between the producing strata 15 and the interior of the casing 12. This is accomplished by perforations 14 made through the casing 12 and the cement sheath 13.

The hydrocarbons flowing out of the producing strata 15 through the perforations 14 and into the interior of the casing 12 are transported to the surface through a production tubing 16. A production packer 17 is installed near the lower end of the production tubing 16 and above the highest perforation to achieve a pressure seal between the production tubing 16 and the casing 12. Production tubings are not always used and, in those cases, the entire interior volume of the casing is used to conduct the hydrocarbons to the surface of the earth.

When diversion is needed during a well treatment, ball sealers 20 are used to close off some of the perforations. These ball sealers are preferred to be approximately spherical in shape, but other geometries may be used.

Using ball sealers 20 to plug some of the perforations 14 is accomplished by introducing the ball sealers 20 into the casing 12 at a predetermined time during the treatment.

When the ball sealers 20 are introduced into the fluid upstream of the perforated parts of the casing, they are carried down the production tubing 16 or casing 12 by the fluid flow. Once the fluid arrives at the perforated interval in the casing, it is displaced outwardly through the perforations 14 and into the strata 15 being treated. The flow of the treating fluid through the perforations 14 carries the entrained ball sealers 20 toward the perforations 14 causing them to seat on the perforations 14. Once seated on the perforations, ball sealers 20 are held onto the perforations by the fluid pressure differential which exists between the inside of the casing and the producing strata 15 on the outside of the casing. The seated ball sealer serves to effectively close those perforations 14 until such time as the pressure differential is reversed, and the ball sealers are released.

The ball sealers 20 will tend to first seal the perforations through which the treating fluid is flowing most rapidly. The preferential closing of the high flowrate perforations tends to equalize treatment of the producing strata over the entire perforated interval.

For maximum effectiveness in seating on perforations the ball sealers preferably should have a density less than the density of the treating fluid in the wellbore at the temperature and pressure conditions encountered downhole. For example, it is not unusual for the bottom hole pressure to exceed 10,000 psi and even reach 15,000 psi during a well treatment. If a ball sealer is not sufficiently strong to withstand these pressures, it will collapse causing the density of the ball sealer to increase to a density which can easily exceed the fluid density.

Figure 2:
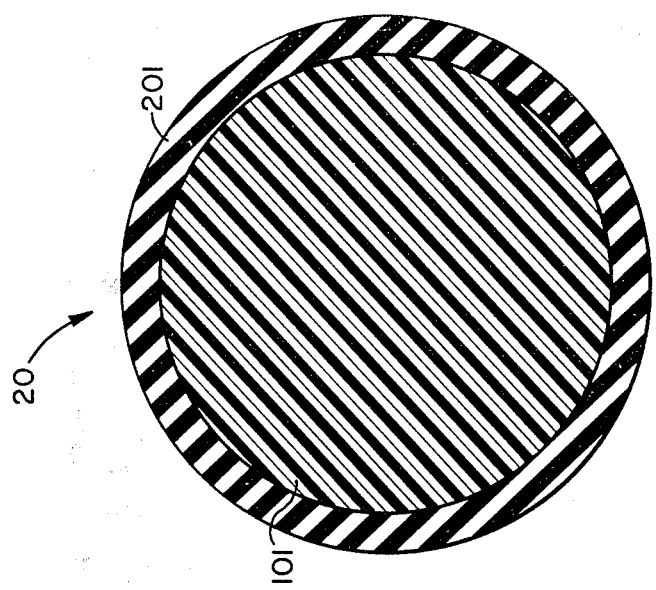
FIG. 2 is a view of a ball sealer in section.

Since fluids used for treating wells generally have densities ranging from approximately 0.7 grams per cubic centimeter (g/cc) to significantly above 1.1 g/cc, a series of lightweight ball sealers are required so as to be buoyant in the treating fluids utilized. One such ball sealer capable of withstanding typical bottomhole treating pressures yet maintaining a density in the 0.7 to 1.2 g/cc range is depicted in FIG. 2. This spherical ball sealer 20 has a spherical core 101 made of syntactic foam and is covered with a polyurethane elastomer 201. Preferably, the polyurethane elastomer comprises a solid polyether- or polyester-based polyurethane. Polyether-based polyurethane is preferred for use in diverting aqueous treating fluid and polyester-based polyurethane is preferred for use in diverting hydrocarbon treating fluids.

Syntactic foam is a material comprised of hollow spherical particles dispersed in some form of binder. The commercially available low density syntactic foams, which are sufficiently strong to withstand the pressures and temperatures typically encountered by ball sealers, are constructed of microscopically small, hollow glass spheres (averaging approximately 50 microns in diameter) dispersed in a resin binder such as epoxy. Syntactic foam systems may also consist of spheres made from materials other than glass and binders made from materials other than epoxy, for example, suitable thermoplastics or thermosetting plastics.

In the preferred embodiment of this invention, a syntactic foam core is covered with a polyurethane elastomer. The ball sealers may be constructed in the following manner. The first step is to produce by casting or by machining from blocks, syntactic foam spheres to be used as the ball sealer core. Suitable syntactic foam cores are then cleaned and coated with a suitable bonding agent and then covered with the desired urethane covering.

Surface preparation, usually involving some form of cleaning technique, is required to assure good bonding between the polyurethane elastomer covering and the syntactic foam core. It is most desirable to use a strong air blast which will remove dust as well as most of the crushed glass and debris created when the cores are made. Sand blasting has been used with good success but its use should be limited to brief treatments due to rapid abrasion of the core. If the spheres are oily, a trichlorylethylene wash may be used satisfactorily. Once the spheres are debris and oil free, they can be coated with a suitable bonding agent selected to form a good bond with polyurethane.

The next step is to mold a polyurethane elastomer cover about the syntactic foam core. This may be accomplished by using an injection technique designed to cover a multiplicity of the syntactic foam balls or cores. An example of a suitable transfer molding system may utilize three platens. Two "concave" platens contain a multiplicity of concave hemispherical cavities having diameters the same as the exterior diameters of the core coverings. A "convex" platen contains a multiplicity of convex hemispherical projections having diameters the same as the diameter of the ball sealers core and are adapted to be concentrically disposed in the concave cavities of the "concave" platens. The first step in covering the syntactic cores is to join one of the "concave" platens to the "convex" platen. Once the two platens are joined, polyurethane is injected into the free space that exists between the concave and convex cavities to form one-half of the covering for the cores. The convex platen should be removed from the concave platen before the polyurethane has completely cured. After the convex platen has been removed, the syntactic foam cores are then inserted into the partially cured polyurethane half-covers. The other concave platen is then joined with the first concave platen such that the concave cavities of the two platens concentrically cover the portion of the balls which are not yet covered with polyurethane. The free space in the hemispherical cavity is then filled with polyurethane to complete the polyurethane cover for the syntactic foam cores. Molding the second half of the polyurethane cover is carried out under conditions of time, temperature, and pressure suitable to cure the newly introduced urethane as well as to activate cross-linking sites in the other partially-cured half cover. This technique has been used to provide good polyurethane-to-polyurethane bonds. Tests have shown that the molding of the polyurethane elastomer on the core provides a substantially constant cover. The actual molding conditions will vary with differing polyurethane formulations and can be determined by those skilled in the art.

Although the ball sealer core material discussed above is syntactic foam, certain thermoplastics can also be used as a core material for lightweight ball sealers. Polymethylpentene has a density of 0.83 g/cc and is a high temperature thermoplastic (melting point approximately 230°-240° C.). All other lightweight plastics, which typically include polybutylene, polyethylene, polypropylene, and polyallomer copolymers, are somewhat heavier than as is acceptable. Furthermore, since these materials are low temperature thermoplastics, they are less desirable as ball sealer cores from the standpoint that they are more likely to extrude into the perforations under the bottom hole temperature and pressure conditions typically encountered. For certain low temperature applications which do not require extremely lightweight ball sealers, it is envisioned that these materials could be incorporated into the improved urethane covered ball sealers of this invention. For even less stringent density constraints, heavier cores using thermoplastic or thermo-setting plastic cores, such as nylon or phenolins, respectively, could be fixed with solvent resistant polyurethane coverings to provide ball sealers of this invention.

Tests carried out on the polyurethane covered syntactic foam ball sealers have shown that they are mechanically stable when subjected to a 1500 psi (100 atms) differential pressure across simulated perforations and when subjected to temperatures on the order of 170° F. (75° C.). For well treating operations in which low differential pressures across the casing perforations are maintained, ball sealers may be used that are made entirely of polyurethane.

The chemical resistance of polyurethane balls was compared with BUNA-N (a rubber commonly used for ball sealer covers) on the basis of shear strength retention. Tests were conducted on samples composed of BUNA-N and polyurethane to simulate punching shear on ball sealers by casing perforations. The test consisted of an ASTM standard shear strength determination carried out essentially as described in ASTM Standards D 732-46, "Shear Strength of Plastics" page 249-251.

Shear strength and thickness measurements were made on test strips of: BUNA-N 490FB and BUNA-N 483, sold by F. H. Maloney Co., and polyurethane 6321-8 and polyurethane 6321-9, polyester polyurethanes sold by Molded Dimensions Company. The samples used in the tests were strips approximately $1\frac{1}{2} \times 5$ inches ($4 \times 13$ centimeters) in dimension and had a thickness of about 0.08 inches (0.20 centimeters). The thickness, hardness, and shear strength of each sample was measured before and after exposure of the samples to xylene in a pressure vessel maintained at 2000 psi (135 atms) and 200° F. (93° C.) for 2 hours. The thickness was measured in several locations on each strip using a friction ratchet micrometer to insure uniformity in measurement. Hardness was measured using a standard Shore A-2 durometer. Five shear tests were carried out on each sample using a shear apparatus and method essentially as required by the ASTM Standard referenced above. The measured changes in the average thickness, hardness and shear strength after exposure to xylene at 200° F. (93° C.) at 2000 psig (135 atms) are summarized in Table I below.

TABLE I

OBSERVED CHANGES IN AVERAGE THICKNESS, HARDNESS, AND SHEAR STRENGTH AFTER 2 HR + EXPOSURE TO 200° F. XYLENE AT 2000 PSIG

| Compound | % Change in Thickness | % Change in Hardness | % Change in Shear Strength |
| --- | --- | --- | --- |
| Polyurethane 6321-8 | 15 | −13 | −39 |
| Polyurethane 6321-9 | 11 | −10 | −46 |
| BUNA-N 490 FB | 20 | −27 | −70 |
| BUNA-N 483 | 34 | −42 | −74 |

The results of these solvent resistance tests demonstrate that the polyurethane compounds evaluated had substantially better dimensional stability, maintained better hardness or compliancy and maintained substantially more shear strength than BUNA-N rubber commonly used to cover ball sealers. These results demonstrate that ball sealers constructed with similar polyurethane covers will perform substantially better than the BUNA-N rubber covered ball sealers when they are exposed to aromatic solvents, such as xylene, commonly used in solvent stimulation of oil wells.

The principle of the invention and the best mode in which it is contemplated to apply that principle have been described. It is to be understood that the foregoing is illustrative only and that other means and techniques can be employed without departing from the true scope of the invention defined in the claims.

We claim:

1. A method of treating a subterranean formation surrounding a cased wellbore wherein the casing has an interval provided with a plurality of perforations, said method comprising:
    (a) flowing down said casing a liquid having suspended therein a plurality of ball sealers, said ball sealers being sized to seal said perforations and comprising a solid core and a polyurethane elastomer cover; and
    (b) continuing the flow of said liquid until at least a portion of said perforations are sealed by said ball sealers.

2. A method as defined in claim 1 wherein said ball sealers have a density less than the treating liquid.

3. A method as defined in claim 1 wherein said treating liquid is a hydrocarbon liquid and said polyurethane elastomer is a polyester-based elastomer.

4. A method as defined in claim 1 wherein said treating liquid is an aqueous liquid and the polyurethane elastomer is a polyether-based elastomer.

5. A method as defined in claim 1 wherein the ball sealers are prepared by transfer molding the polyurethane elastomer on said core to form a substantially constant thickness cover.

6. A method as defined in claim 1 wherein said core is syntactic foam.

7. A method of treating a subterranean formation surrounding a cased wellbore wherein the casing has an interval provided with a plurality of perforations, said method comprising:

(a) flowing down said casing to said perforated interval a plurality of ball sealers suspended in a hydrocarbon liquid, said ball sealers having a density less than the density of said liquid and being sized to seal said perforations, said ball sealers including a solid core and a polyester-based polyurethane elastomer; and (b) continuing the flow of said liquid until said ball sealers seal at least a portion of said perforations.

8. The method as defined in claim 7 wherein the density of the ball sealer ranges between 0.7 g/cc and 1.2 g/cc.

9. In a method of sequentially treating two strata of a subterranean formation surrounding a well casing having a plurality of perforations formed therein wherein ball sealers suspended in the treating fluid are used to seal part of said perforations, the improvement wherein the ball sealers comprise a polyurethane elastomer.

10. A ball sealer for plugging perforations in a well casing comprising a core of polymethylpentene and an elastomeric covering comprising polyurethane.

11. A ball sealer for plugging perforations in a casing penetrating subterranean formations which comprises a syntactic foam core and a polyurethane, elastomer coating which covers the core.

12. A ball sealer as defined in claim 11 wherein the density of the ball sealer ranges between 0.70 g/cm$^3$ and 1.2 g/cm$^3$.

* * * * *